United States Patent [19]
Lüder et al.

[11] Patent Number: 5,471,723
[45] Date of Patent: Dec. 5, 1995

[54] METHODS OF MANUFACTURING THIN-FILM ABSOLUTE PRESSURE SENSORS

[75] Inventors: Ernst Lüder, Stuttgart; Traugott Kallfass, Grossbottwar; Masoud Habibi, Stuttgart; Frank Hegner, Lörrach; Georg Schneider, Schopfheim, all of Germany

[73] Assignee: Endress + Hauser GmbH + Co., Germany

[21] Appl. No.: 280,616

[22] Filed: Jul. 26, 1994

[30] Foreign Application Priority Data

Aug. 20, 1993 [EP] European Pat. Off. .............. 93810587

[51] Int. Cl.⁶ ..................................... H01G 5/16
[52] U.S. Cl. .............................. 29/25.41; 73/724; 427/79
[58] Field of Search .................... 29/25.41, 25.42; 427/79, 81; 73/724, 718; 361/283

[56] References Cited

U.S. PATENT DOCUMENTS

4,838,088  6/1989  Murakami .

FOREIGN PATENT DOCUMENTS

0472108  2/1992  European Pat. Off. .
3108300  3/1982  Germany .
4004179  8/1991  Germany .

OTHER PUBLICATIONS

M M Farooqui et al., "A polysilicon–diaphragm–based pressure sensor technology", J. Phys. E: Sci. Instrum., vol. 20, pp. 1469–1471, 1987.
H. Dudaicevs et al., "Oberflächenmikromechanik für die Herstellung von Silizium–Drucksensoren", VDI Berichte, No. 939, pp. 185–190, 1992 (with partial translation).
H. Guckel, "Surface micromachined pressure transducers", Sensors and Actuators, vol. 28, pp. 133–146, 1991.
C. Linder et al., "Investigations On Free–Standing Polysilicon Beams in View of their Application as Transducers", Sensors and Actuators, vol. A21–A23, pp. 1053–1059, 1990.

*Primary Examiner*—Carl E. Hall
*Attorney, Agent, or Firm*—Barnes & Thornburg

[57] ABSTRACT

Resistive and capacitive absolute pressure sensors are disclosed which are made by surface micromachining and thin-film techniques. In the case of a capacitive sensor, the electrodes have a high insulation resistance relative to each other, the diaphragm exhibits only little tensile strain in the finished condition, no sublimation step is necessary to prevent the diaphragm from sticking to the substrate, the diaphragm provides a measurement signal over a wide pressure range even if its rests against the substrate, the measurement signal is virtually temperature-independent, and only few chemical-vapor-deposition and photolithographic steps are necessary. The capacitive sensor has a glass substrate and a diaphragm which bound a hermetically sealed cavity, the substrate supporting, on the cavity side, a substrate electrode with first interconnection tracks or corner pads extending therefrom, the diaphragm being made of the material of a first insulating layer, which firmly adheres, at least in part, to the substrate at the edge of the cavity, and supporting, on the side remote from the cavity, a top electrode and a second insulating layer which completely covers the top electrode and the diaphragm and hermetically seals the cavity, and the top electrode having second interconnection tracks extending therefrom onto the first insulating layer outside the diaphragm. In the case of a resistive sensor, the substrate electrode is omitted, and the top electrode is replaced by a half or full bridge consisting of piezoresistors. Four manufacturing process variants are disclosed.

19 Claims, 8 Drawing Sheets

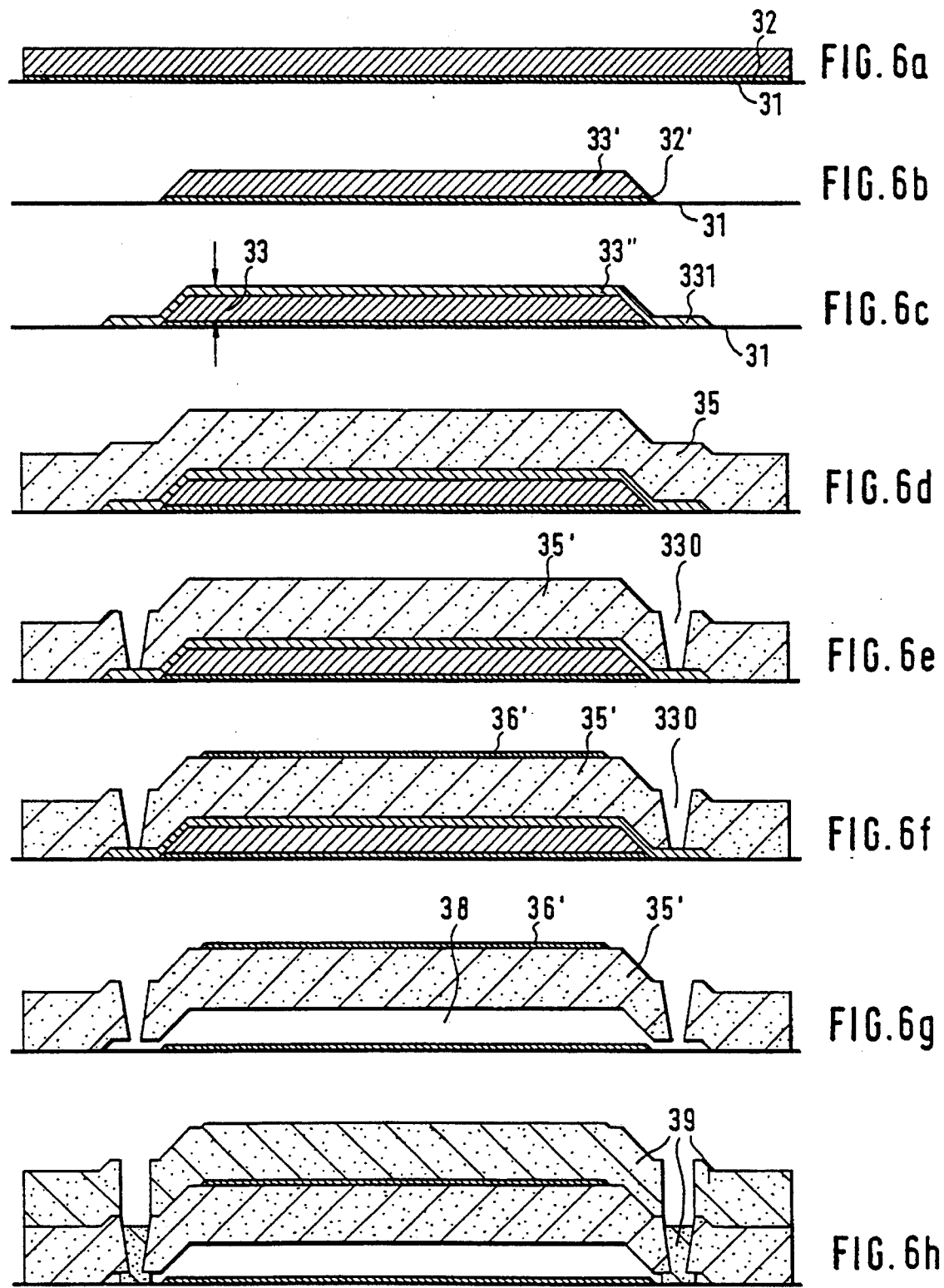

METHODS OF MANUFACTURING THIN-FILM ABSOLUTE PRESSURE SENSORS

FIELD OF THE INVENTION

The present invention relates to thin-film absolute pressure sensors with a base element and a diaphragm which bound a hermetically sealed cavity, and to the manufacture of such sensors.

BACKGROUND OF THE INVENTION

Such absolute pressure sensors have not become known until now. The literature describes only those pressure sensors which are manufactured by semiconductor processes.

For instance, in the journal "J. Phys. E: Sci. Instrum.", Vol. 20 (1987), pages 1469 to 1471, a pressure sensor is described in which a polycrystalline silicon diaphragm is provided on a single-crystal silicon substrate, so that the diaphragm is not electrically insulated from the substrate. The diaphragm is first deposited on an $SiO_2$ sacrificial layer, which is then removed underneath the diaphragm.

Thus, a space-charge region is formed at the boundary between polycrystalline silicon diaphragm and silicon substrate, so that the capacitance of this pressure sensor is strain- and temperature-dependent. Furthermore, the capacitance can be measured only by high-frequency sensing, not by low-frequency sensing.

In the journal "VDI Berichte", No. 939, 1992, pages 185 to 190, a high-pressure sensor is described in which a single-crystal silicon substrate supports a polycrystalline silicon diaphragm insulated from the substrate by means of a silicon-nitride film.

A similar pressure sensor with a polysilicon diaphragm insulated from the silicon substrate and a method of manufacturing such a sensor are described in DE-A-40 04 179.

As is stated in the journal "Sensors and Actuators", Vol. 28 (1991), pages 133 to 146, polysilicon films deposited on silicon exhibit built-in compressive strain. This results in a hysteresis of the pressure-capacitance characteristic and deteriorates the response of the pressure sensor to temperature changes.

In the case of a polysilicon diaphragm, the compressive strain in the as-deposited film can only be prevented by modifying the manufacturing process so that a defined tensile strain is produced in the diaphragm.

In the case of these prior art pressure sensors, and also in the sensors described in the journal "Sensors and Actuators", Vol. A21–A23 (1990), pages 1053 to 1059, the cavity is formed by first depositing an $SiO_2$ sacrificial layer, then depositing the polysilicon diaphragm, and subsequently removing the sacrificial layer by etching in hydrofluoric acid.

This, however, has further disadvantages. After the etching in hydrofluoric acid, which is followed by rinsing in deionized water and drying, the thin polysilicon diaphragms generally stick to the silicon-substrate surface. This can only be prevented by taking complicated and costly countermeasures, which are explained in detail in the prior art mentioned above.

In addition, electrostatic fields, which are present at the surfaces of the silicon substrate and the polysilicon diaphragms a result of the etching and thereafter, lead to undesired deflection of the diaphragm. To eliminate this deflection, a bias voltage is necessary.

DE-A-37 23 561 describes a further semiconductor process for manufacturing a capacitive pressure sensor in which the sacrificial layer defining the cavity to be formed is etched away through openings in a first insulating layer which lie within the diaphragm area. Then, however, the material of the top electrode can penetrate into the cavity. This degrades the electrical properties of the pressure sensor.

To prevent this, a second insulating layer is provided which has a plurality of openings displaced in relation to the openings of the first insulating layer and prevents material of the top electrode from penetrating into the cavity. However, this second insulating layer complicates the manufacture considerably.

By contrast with the prior art, the problem underlying the invention is to provide resistive and capacitive absolute pressure sensors and processes for manufacturing same by surface-micromachining and thin-film techniques, with the electrodes of the at least one capacitor in a capacitive thin-film absolute pressure sensor having a high insulation resistance relative to each other, the respective diaphragms in resistive and capacitive thin-film absolute pressure sensors exhibiting only little tensile strain in the finished condition, no sublimation step being necessary to prevent the diaphragm from sticking to the substrate, the diaphragm providing a measurement signal over a wide pressure range even if it rests against the substrate in the event of an overload, the measurement signal being virtually independent of temperature, and only few chemical-vapor-deposition and photolithographic steps being necessary.

SUMMARY OF THE INVENTION

A first solution to this problem consists in the provision of a capacitive thin-film absolute pressure sensor comprising a glass substrate as a base element and a diaphragm which bound a hermetically sealed cavity, with the base element supporting, on the cavity side, a substrate electrode having first interconnection tracks or corner pads extending therefrom, the diaphragm made of the material of a first insulating layer which firmly adheres, at least in part, to the base element at the edge of the cavity, the diaphragm supporting, on the side remote from the cavity, a top electrode and a second insulating layer which completely covers the top electrode and the diaphragm and hermetically seals the cavity, and the top electrode having second interconnection tracks extending therefrom onto the first insulating layer outside the diaphragm.

A second solution to the problem consists in the provision of a resistive thin-film absolute pressure sensor comprising a glass substrate as a base element and a diaphragm which bound a hermetically sealed cavity, with the diaphragm made of the material of a first insulating layer which firmly adheres to the base element around the edge of the cavity, the diaphragm supporting, on the side remote from the cavity, a piezoresistive half bridge or a piezoresistive full bridge and a second insulating layer which completely covers said bridge and the diaphragm, and the piezoresistive half or full bridge having leads extending therefrom onto the base element outside the diaphragm.

A third solution to the problem consists in the provision of a thin-film process for manufacturing a capacitive absolute pressure sensor with a base element and a diaphragm which bound a hermetically sealed cavity, comprising the following steps in the order given:

a) depositing a first metal layer over the entire surface of a glass substrate serving as the base element, said first metal layer containing a substrate electrode to be formed;

b) depositing over the entire surface a patternable material layer which defines the height of the cavity and contains a sacrificial layer to be formed;

c) patterning the patternable material layer and the first metal layer in a single, first photoresist step by etching for simultaneously forming the substrate electrode, first interconnection tracks connected therewith, and the sacrificial layer, which is practically congruent with the base electrode and the first interconnection tracks, thereby partially exposing the glass substrate;

d) depositing a first insulating layer containing the diaphragm over the entire surface, so that said first insulating layer firmly adheres to the areas of the glass substrate exposed in step c), even in an edge region next to the sacrificial layer;

e) forming, in a photoresist layer deposited over the entire surface, a photoresist mask whose opening is congruent with a top electrode to be formed, which will extend onto the edge region of the first insulating layer next to the sacrificial layer, and with second interconnection tracks connected with the top electrode;

f) depositing a second metal layer containing the top electrode over the entire surface of the photoresist mask;

g) removing the photoresist mask with the overlying portions of the second metal layer by a lift-off step;

h) etching away the portions of the first insulating layer not covered by the top electrode and by the second interconnection tracks;

i) removing the sacrificial layer by lateral etching, starting from its portions lying on the first interconnection tracks, and k) hermetically sealing the cavity by depositing a second insulating layer over the entire surface in a vacuum.

A fourth solution to the above problem consists in the provision of a thin-film process for manufacturing a capacitive absolute pressure sensor with a base element and a diaphragm of substantially rectangular or square shape which bound a hermetically sealed cavity, comprising the following steps in the order given:

a) depositing a first metal layer over the entire surface of a glass substrate serving as the base element, said first metal layer containing a substrate electrode to be formed;

b) depositing over the surface entire a patternable material layer which defines the height of the cavity and contains a sacrificial layer to be formed;

c') patterning the patternable material layer and the first metal layer in a single, first photoresist step by etching for simultaneously forming the substrate electrode, corner pads connected therewith, and the sacrificial layer, which is practically congruent with the substrate electrode and the corner pads, thereby partially exposing the glass substrate;

d') depositing a first insulating layer containing the diaphragm over the entire surface, so that said insulating layer firmly adheres to the areas of the glass substrate exposed in step c'), even in four lateral regions next to the sacrificial layer, and etching openings into the first insulating layer for the subsequent supply of an etchant to the sacrificial layer, said openings lying over at least a part of the four corner pads of one absolute pressure sensor;

e') forming, in a photoresist layer deposited over the entire surface, a photoresist mask whose opening is congruent with a top electrode to be formed and with interconnection tracks connected therewith and is centered with the substrate electrode without the corner pads;

f) depositing a second metal layer containing the top electrode over the entire surface of the photoresist mask;

g) removing the photoresist mask with the overlying portions of the second metal layer by a lift-off step;

i') removing the sacrificial layer by vertical etching and lateral etching through the openings, and k') hermetically sealing the openings, and thus the cavity, by depositing a second insulating layer in a vacuum.

A fifth solution to the above problem consists in the provision of a thin-film process for manufacturing a capacitive absolute pressure sensor with a base element and a diaphragm which bound a hermetically sealed cavity, comprising the following steps in the order given:

a) depositing a first metal layer over the entire surface of a glass substrate serving as the base element, said first metal layer containing a substrate electrode to be formed;

b") depositing over the entire surface a first patternable material layer containing a first partial layer of a sacrificial layer to be formed, said first partial layer defining a first part of the height of the cavity;

c") patterning the patternable material layer and the first metal layer in a single, first photoresist step by etching for simultaneously forming the substrate electrode, first interconnection tracks connected therewith, and the first partial layer, which is practically congruent with the substrate electrode and the first interconnection tracks;

c'") depositing over the entire surface a second patternable material layer which defines the remainder of the height of the cavity and contains a second partial layer of the sacrificial layer to be formed and two diametrically opposed corner extensions, and patterning said second patternable material layer in a second photoresist step so that it completely covers the first partial layer;

d") depositing a first insulating layer containing the diaphragm over the entire surface, so that said first insulating layer firmly adheres to the areas of the glass substrate still exposed after step c'"), and etching openings into the first insulating layer above the corner extension for the subsequent supply of an etchant to the sacrificial layer;

e") forming, in a photoresist layer deposited over the entire surface, a photoresist mask whose opening is congruent with a top electrode to be formed and with second interconnection tracks connected therewith and is centered with the substrate electrode;

f) depositing a second metal layer containing the top electrode over the entire surface of the photoresist mask;

g) removing the photoresist mask with the overlying portions of the second metal layer by a lift-off step;

i') removing the sacrificial layer by vertical etching and lateral etching through the openings, and k') hermetically sealing the openings, and thus the cavity, by depositing a second insulating layer in a vacuum.

A sixth solution to the above problem consists in the provision of a thin-film process for manufacturing a capacitive absolute pressure sensor with a base element and a diaphragm which bound a hermetically sealed cavity, comprising the following steps in the order given:

a') depositing a first metal layer over the entire surface of a glass substrate serving as the base element, said first metal layer containing a substrate electrode to be formed, and subsequently patterning said first metal layer in a first photoresist step for forming the substrate electrode and first interconnection tracks connected therewith;

b''') depositing over the entire surface a first patternable material layer which defines a first part of the height of the cavity and contains a first partial layer of a sacrificial layer to be formed, and patterning said first patternable material layer in a second photoresist step so that it completely covers the substrate electrode;

c'''') depositing over the entire surface a second patternable material layer which defines the remainder of the height of the cavity and contains a second partial layer of the sacrificial layer to be formed and two diametrically opposed corner extensions, and patterning said second patternable material layer in a third photoresist step so that it completely covers the first partial layer;

d'') depositing over the entire surface a first insulating layer containing the diaphragm, so that said first insulating layer firmly adheres to the areas of the glass substrate still exposed after step c''''), and etching openings into the first insulating layer above the corner extensions for the subsequent supply of an etchant to the sacrificial layer;

e''') forming, in a photoresist layer deposited over the entire surface, a photoresist mask whose opening is congruent with a top electrode to be formed and with second interconnection tracks connected therewith and is centered with the substrate electrode;

f) depositing a second metal layer containing the top electrode over the entire surface of the photoresist mask;

g) removing the photoresist mask with the overlying portions of the second metal layer by a lift-off step;

i') removing the sacrificial layer by vertical etching and lateral etching through the openings, and k') hermetically sealing the openings, and thus the cavity, by depositing a second insulating layer in a vacuum.

In these quotations of the independent claims, identical letters indicate the identity of the respective features in several claims, while apostrophes used with identical letters indicate that these features are equal in principle but differ in detail.

The material for the first metal layer and/or second metal layer is preferably chromium. For the sacrificial layers, aluminum is preferably used. The insulating layers are preferably of $SiO_2$, which is applied by plasma chemical vapor deposition.

In the first process variant of the invention, the top electrode may serve as a mask for patterning the first insulating layer.

One of the advantages of the invention is that, in contrast to the above-explained prior art semiconductor processes for manufacturing pressure sensors, no diffusion steps are necessary in the invention.

Unlike the above-mentioned semiconductor pressure sensors with a polysilicon diaphragm, the absolute pressure sensors according to the invention have a diaphragm of an insulating material, preferably an $SiO_2$ diaphragm.

BRIEF DESCRIPTION OF THE DRAWINGS

The invention will become more apparent from the following description of embodiments when taken in conjunction with the accompanying drawings, in which:

FIG. 6 shows sections taken along line A—A of FIG. 5;

DETAILED DESCRIPTION OF THE INVENTION

Figure 1:
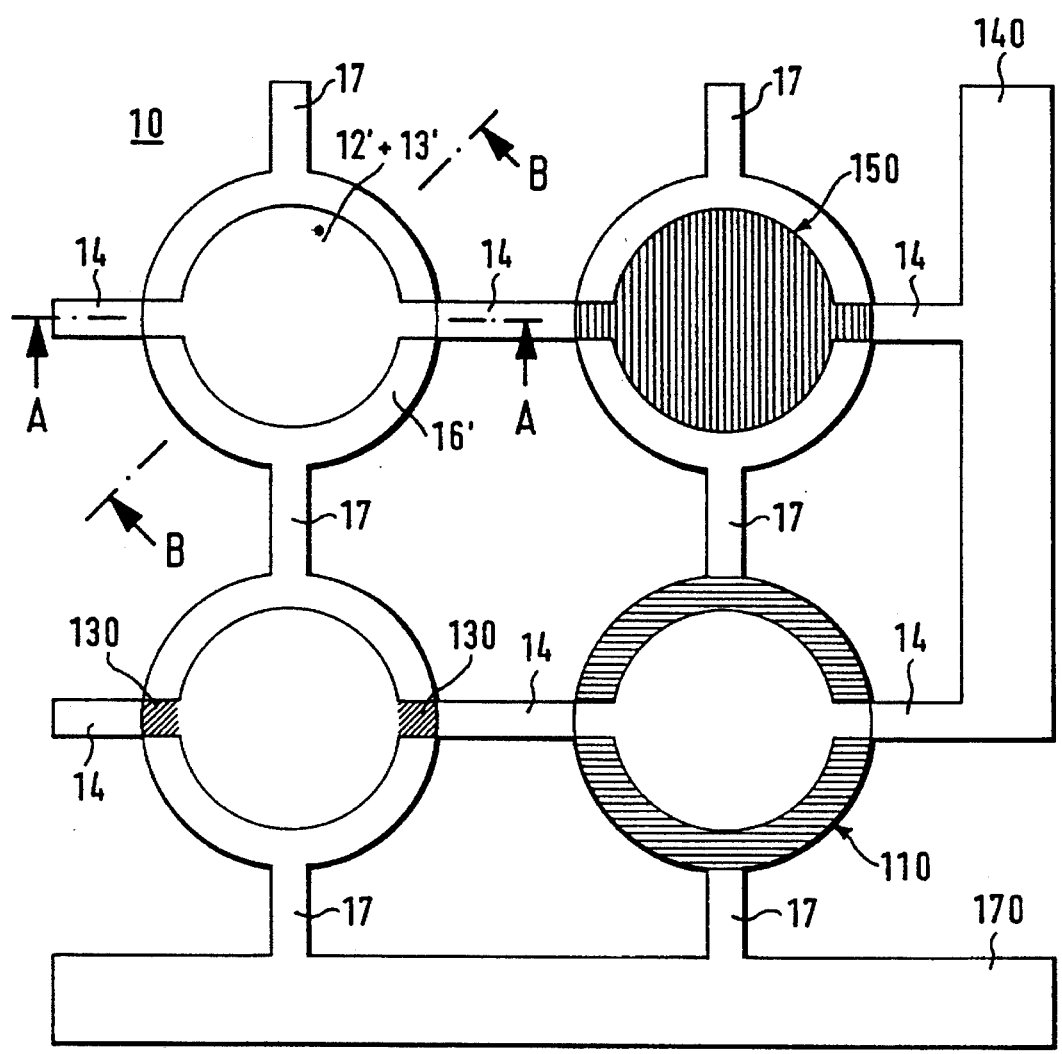
FIG. 1 is a top view of four capacitive absolute pressure sensors according to the first variant of the invention which are manufactured according to the first process variant.

FIG. 1 is a top view of an array of four circular absolute pressure sensors according to the first variant of the invention which are manufactured according to the first process variant, as will be explained below. Of these four absolute pressure sensors, only the one at the upper left is shown in its standard form, while in the case of each of the other three, a characteristic portion, which will be explained below, is set off by hatching.

FIGS. 2a to 2h are sections taken along line A—A or B—B of FIG. 1 which illustrate the results of sequential process steps.

The manufacture starts with a glass substrate 11 serving as a base element. A first metal layer 12, preferably of chromium, containing, inter alia, a substrate electrode 12' to be formed, is deposited over the entire area of the substrate, which may be done by vapor evaporation, for example. The thickness of a chromium metal layer is 100 nm, for example.

It should be pointed out that the term "deposition over the entire surface" as used herein means a process in which a layer is deposited over the entire surface of a structure already present at the beginning of a given process step, thus completely covering that surface.

A patternable material layer 13, preferably of aluminum, which defines the height of the cavity of the finished absolute pressure sensor and contains a sacrificial layer 13' to be formed, is deposited over the entire surface of the first metal layer 12. If made of aluminum, the material layer has a thickness of, e.g., 500 nm.

Figure 2A:
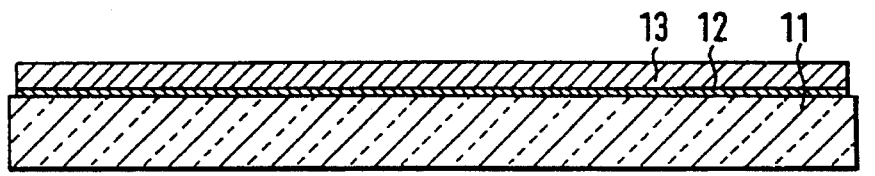
FIG. 2 shows sections taken along line A—A or B—B of FIG. 1.
Figure 2B:
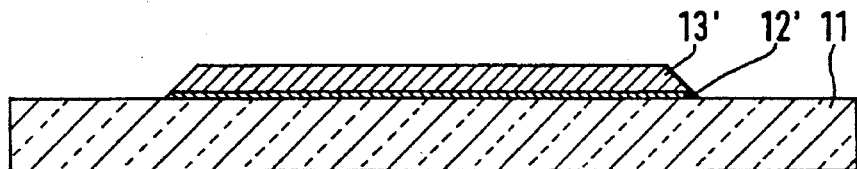
Figure 2C:
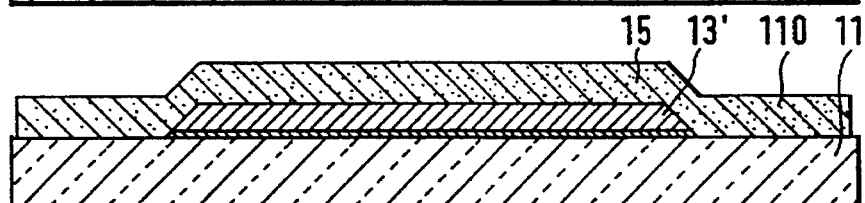
Figure 2D:
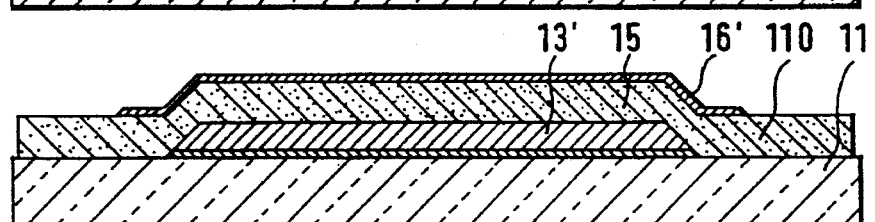

The result of these process steps is shown in FIG. 2a, which is a section taken along line A—A of FIG. 1.

Next the material layer 13 and the first metal layer 12 are patterned in a single, first photoresist step, in which a suitable photoresist mask serves as an etch mask, as is well known, such that, on the one hand, the individual substrate electrodes 12' are separated from each other and that, on the other hand, interconnection tracks 14 are left behind, which extend from the substrate electrode 12'. By this process step, the sacrificial layer 13' is formed on the substrate electrode and the interconnection tracks, see FIG. 2b, which is a section taken along line B—B of FIG. 1 (the interconnection tracks are not visible in FIG. 2b).

This common patterning of the first metal layer 12 and the material layer 13 is performed through the same photoresist mask in two etch steps, namely in a first etch step for etching the (aluminum) material layer 13 and in a subsequent, second etch step for etching the (chromium) metal layer 12.

As can be seen in FIG. 1, if a plurality of absolute pressure sensors are fabricated simultaneously and are to be electrically connected in parallel, horizontal interconnection tracks 14 are provided which interconnect the substrate electrodes 12' of these absolute pressure sensors and lead to a substrate electrode contact pad 140.

If absolute pressure sensors are to be used singly, one of the two interconnection tracks 14 shown in FIG. 1 for each absolute pressure sensor can, of course, be omitted.

Over the structure formed so far, i.e., over the surfaces of the sacrificial layer 13' and the glass substrate 11, a first insulating layer 15 is deposited, a part of which will later become a diaphragm 15'. This insulating layer 15 is preferably of SiO$_2$, which is applied by plasma chemical vapor deposition, and it has a thickness of, e.g., 3 μm, cf. FIG. 2c, which is a section taken along line B—B of FIG. 1.

The insulating layer 15 makes a firm bond with the glass substrate 11, even in an edge region 110 next to the substrate electrode 12'. This is illustrated in FIG. 1 at the lower right by the horizontally hatched area 110. There is no hatching above the interconnection tracks 14 and the overlying portions of the sacrificial layer 13', since the insulating layer will be etched away there.

The entire surface of the structure formed so far is then covered with a photoresist layer. Therein a photoresist mask is formed whose opening is congruent with a top electrode 16' to be formed, which extends onto the edge portion 110 of the first insulating layer 15 next to the sacrificial layer 13', and with second interconnection tracks 17 to be formed, which are connected to the top electrode 16'. A second metal layer, containing the top electrode 16', is then deposited over the entire surface of the photoresist mask. Next the photoresist mask with the overlying portions of the second metal layer is removed by a lift-off step. This is done, for example, in an acetone bath under the action of ultrasound. Of the second metal layer, the top electrode 16' and the interconnection tracks 17 are thus left, cf. FIG. 2d, which is a section taken along line B—B of FIG. 1.

Figure 2E:
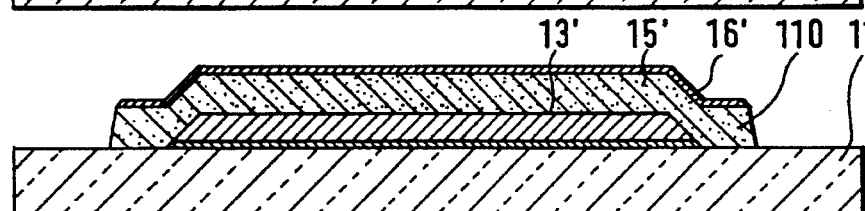

Then, the parts of the first insulating layer 15 not covered by the top electrode 16' and the second interconnection tracks 17 are etched away, exposing, inter alia, those parts of the sacrificial layer 13' which lie over the interconnection tracks 14, cf. FIG. 2e, which is a section taken along line B—B of FIG. 1. If the first insulating layer 15 is of SiO$_2$, the etching will preferably be carried out in a CF$_4$—O$_2$ plasma.

The sacrificial layer 13' is then removed by lateral etching.

The etching begins in those places 130 which lie over the interconnection tracks 14 at the edge of the top electrode 16', from which places the etchant, after having etched away the portions of the sacrificial layer 13' overlying the first interconnection tracks 14, penetrates under the diaphragm 15' and continues to etch inwards.

Figure 2F:
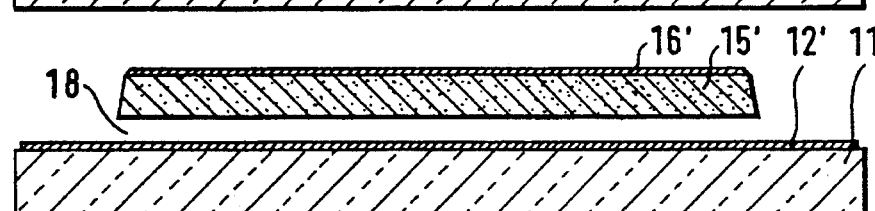

Thus a cavity 18 is created, namely the aforementioned cavity by which the substrate electrode 12' and the diaphragm 15' are separated, cf. FIG. 2f, which is a section taken along line A—A of FIG. 1.

The result of this lateral etching with respect to the first insulating layer 15, which contains the diaphragm 15', is also illustrated in FIG. 1 at the upper right by the vertically hatched area 150, which marks the uncovered portions of the insulating layer 15. It can be seen that the diaphragm 15' is also exposed above a respective part of the interconnection tracks 14.

Finally the cavity 18 is hermetically sealed, in the laterally open places 130, by depositing a second insulating layer 19 over the entire surface of the structure in a vacuum. Thus, after the sealing, the cavity is evacuated, which is essential for absolute pressure sensors, as is well known.

Figure 2G:
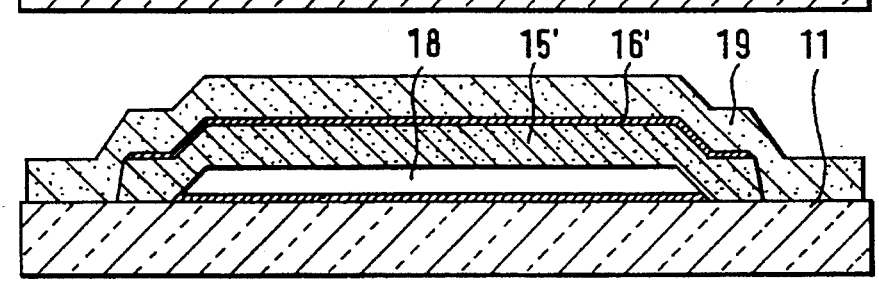
Figure 2H:
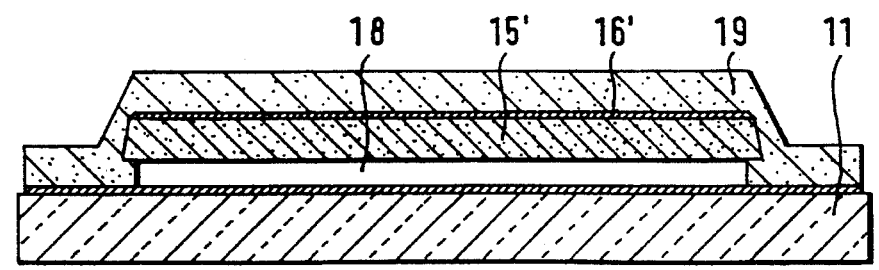

The second insulating layer 19 also serves as a protective layer of the absolute pressure sensor, cf. FIG. 2g, which is a section taken along line B—B of FIG. 1, and FIG. 2h, a section taken along line A—A of FIG. 1.

The second insulating layer 19, too, is preferably of SiO$_2$, which is applied by plasma chemical vapor deposition and has a thickness of, e.g., 3 μm.

As mentioned, during the patterning of the second metal layer, like during the patterning of the first metal layer 12, interconnection tracks 17 are left which are extensions of the top electrodes 16'. As shown in FIG. 1, if a plurality of absolute pressure sensors are fabricated simultaneously and are to be electrically connected in parallel, two interconnection tracks 17 are provided per sensor which are arranged diametrically in a vertical direction, interconnect the top electrodes 16' of the individual absolute pressure sensors, and lead to a top electrode contact pad 170. If absolute pressure sensors are to be used singly, one of the two interconnection tracks 17 can, of course, be omitted.

Figure 3A:
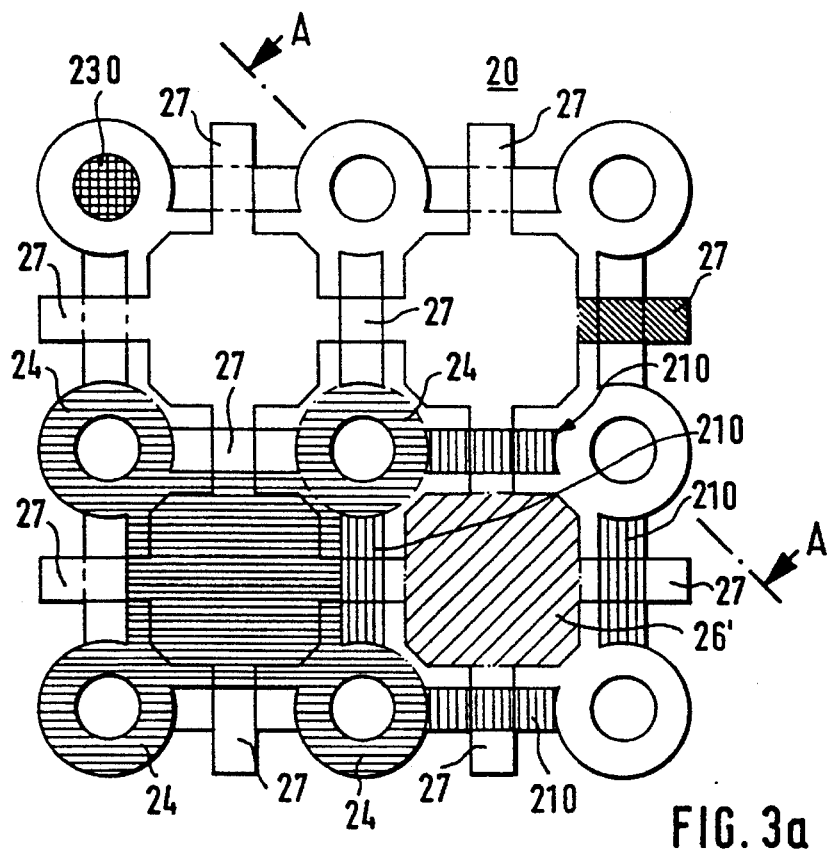
FIG. 3 is a top view of four capacitive absolute pressure sensors according to the first variant of the invention which are manufactured according to the second process variant.
Figure 3B:
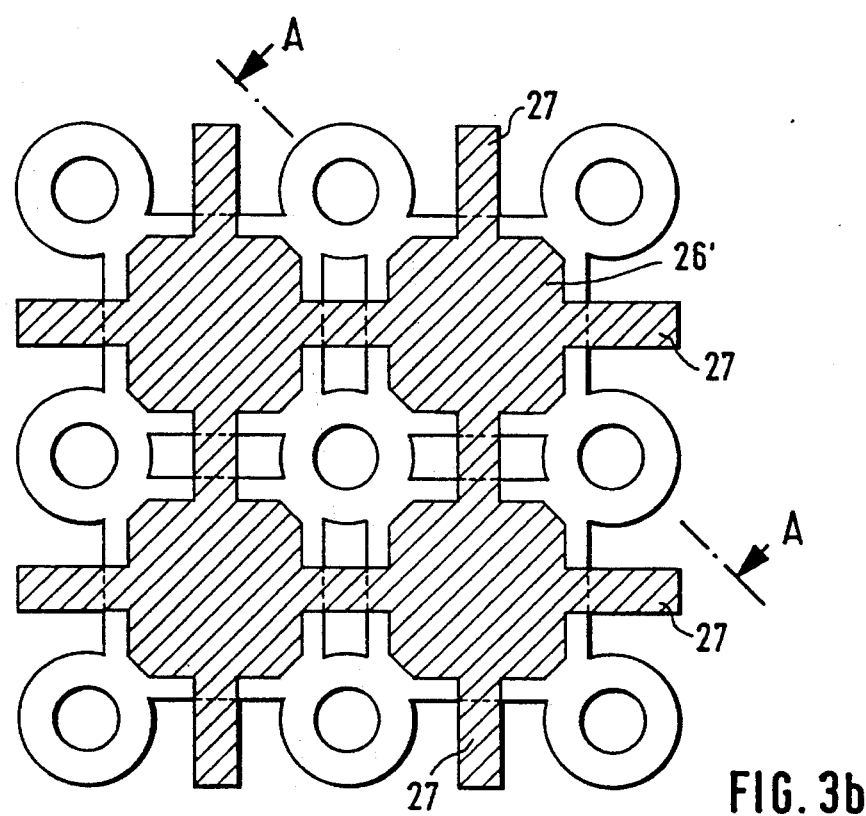

FIG. 3, a representation comparable to that of FIG. 1, is a top view of an array of four virtually square absolute pressure sensors 20 according to the first variant of the invention which are manufactured according to the second process variant, as will be explained below. In FIG. 3a, different layers and parts of the absolute pressure sensors are set off by different hatchings, while FIG. 3b shows the finished absolute pressure sensors in a top view.

FIGS. 4a to 4h are sections taken along line A—A of FIG. 3 which show the results of sequential process steps.

The second process variant of the invention, like the first, starts with a glass substrate 21, of which only one surface can be seen in FIGS. 4a to 4h as the lower edge of the respective section to simplify the illustration.

A first metal layer 22, preferably of chromium, which contains, inter alia, a substrate electrode 22' to be formed, is deposited on the glass substrate 21, e.g., by evaporation. The thickness of the chromium substrate electrode is again 100 nm, for example.

Figure 4A:
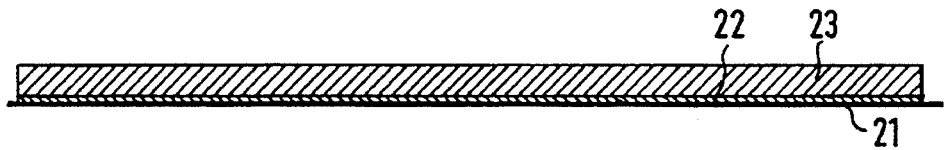
FIG. 4 shows sections taken along line A—A of FIG. 3.

The first metal layer 22 is covered with a patternable material layer 23, preferably an aluminum layer, which defines the height of the cavity 28 of the finished absolute pressure sensor. If this layer is of aluminum, its thickness is 500 nm, for example. The result of these process steps is shown in FIG. 4a.

Figure 4B:
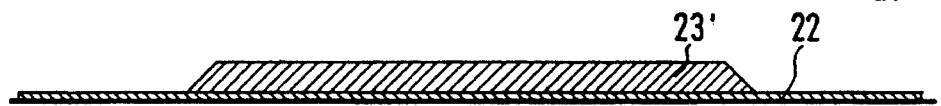
Figure 4C:

The patternable material layer 23 and the first metal layer 22 are then patterned in a single, first photoresist step by etching to simultaneously form the substrate electrode 22, corner pads 24 connected therewith, and the sacrificial layer 23', which is virtually congruent with the substrate electrode and the corner pads, exposing parts of the surface of the glass substrate 21, cf. FIG. 4c.

This common patterning of the metal layer 22 and the material layer 23 is again performed through the same photoresist mask in two etch steps, namely in a first etch step for etching the (aluminum) material layer 23 and in a subsequent, second etch step for etching the (chromium) metal layer 22. The results of these two etch steps are shown in FIGS. 4b and 4c, respectively.

In the second process of the invention, like in FIG. 1, a contact pad may be provided for the substrate electrode; this pad is not shown in FIG. 3 for convenience of illustration.

In the next process step, a first insulating layer 25, which contains the diaphragm 25', is deposited over the entire surface, so that it firmly adheres to the exposed areas of the glass substrate 21, even in four lateral regions 210 next to the substrate electrode 22'.

Figure 4D:
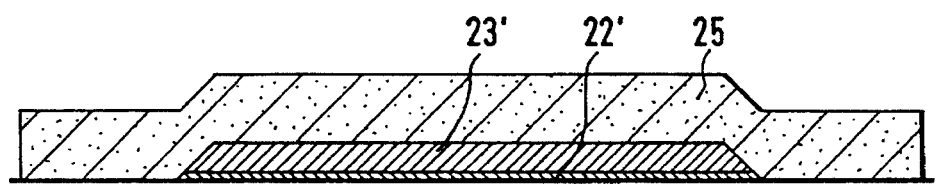
Figure 4E:
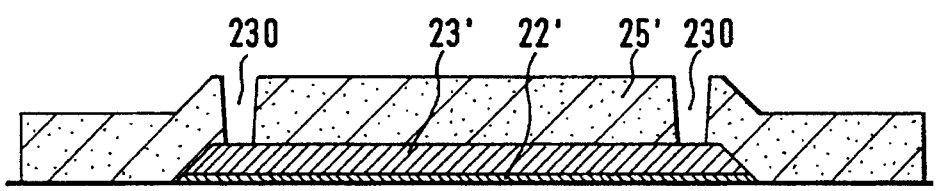
Figure 4F:
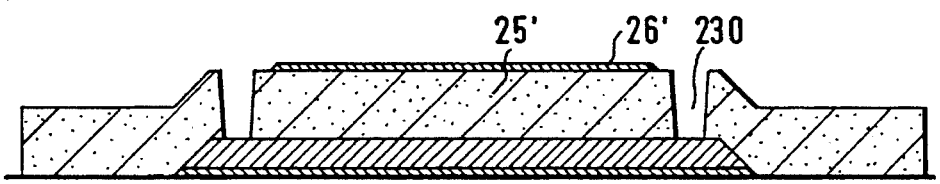
Figure 4G:
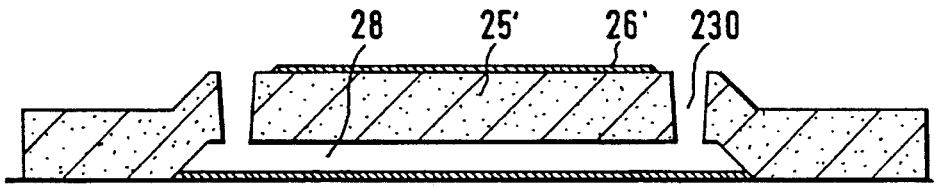

This insulating layer 25 is preferably of $SiO_2$, which is deposited by plasma chemical vapor deposition, and it has a thickness of, e.g., 3 μm, cf. FIG. 4d. In the aforementioned lateral regions 210, the insulating layer 25 forms a firm bond with the glass substrate 21.

Thereafter, openings 230 for the subsequent supply of an etchant to the sacrificial layer 23' are etched into the first insulating layer 25 over at least a part of the four corner pads 24 belonging to a respective one of the absolute pressure sensors. Preferably, the openings 230 are respectively formed over two diametrically opposed corner pads, cf. FIG. 4e and FIG. 3a, in which such an opening 230 is marked at the upper left with a checkered pattern, and from which it is apparent that the openings 230 are disposed at the periphery of the absolute pressure sensor outside the diaphragm 25' to be formed.

If the insulating layer 25 is of $SiO_2$, the etching will preferably be carried out in a $CF_4$—$O_2$ plasma. During this etching, the sacrificial layer 23' prevents the glass substrate from being etched at the surface; in the first variant, this superficial etching is tolerated.

Next a photoresist mask is formed in a photoresist layer deposited over the entire surface. The opening of the mask is congruent, on the one hand, with a top electrode 26' to be formed and, on the other hand, with horizontal and vertical interconnection tracks 27 connected with the top electrode 26', and is centered with the substrate electrode 22'—without regard to the corner pads 24—, cf. the obliquely hatched areas in FIGS. 3a and 3b, and FIG. 4f.

The entire surface of the photoresist mask is then coated with a second metal layer containing the top electrode 26'. Thereafter, as in the above-mentioned first variant, the photoresist mask with the overlying portions of the second metal layer is removed by a lift-off step. Thus, of the second metal layer, the top electrodes 26' and the interconnection tracks 27 connected therewith are left, cf. FIG. 4f.

In the next process step, the cavity 28 is formed by removing the sacrificial layer 23' by vertical etching in the openings 230 and by lateral etching under the diaphragm 25'. The substrate electrode 22' and the diaphragm 25' are now separated by the cavity 28, cf. FIG. 4g.

Figure 4H:
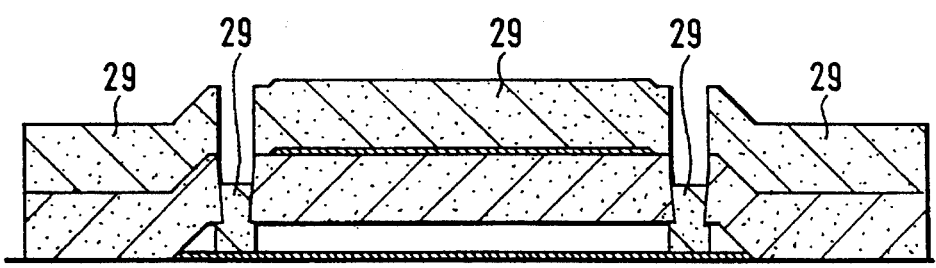

Finally, the openings 230 and, thus, the cavity 28 are hermetically sealed by vacuum-depositing a second insulating layer 29, cf. FIG. 4h. The second insulating layer 29, too, is preferably of $SiO_2$, which is applied by plasma chemical vapor deposition, and it has a thickness of 3 μm, for example.

Figure 5:
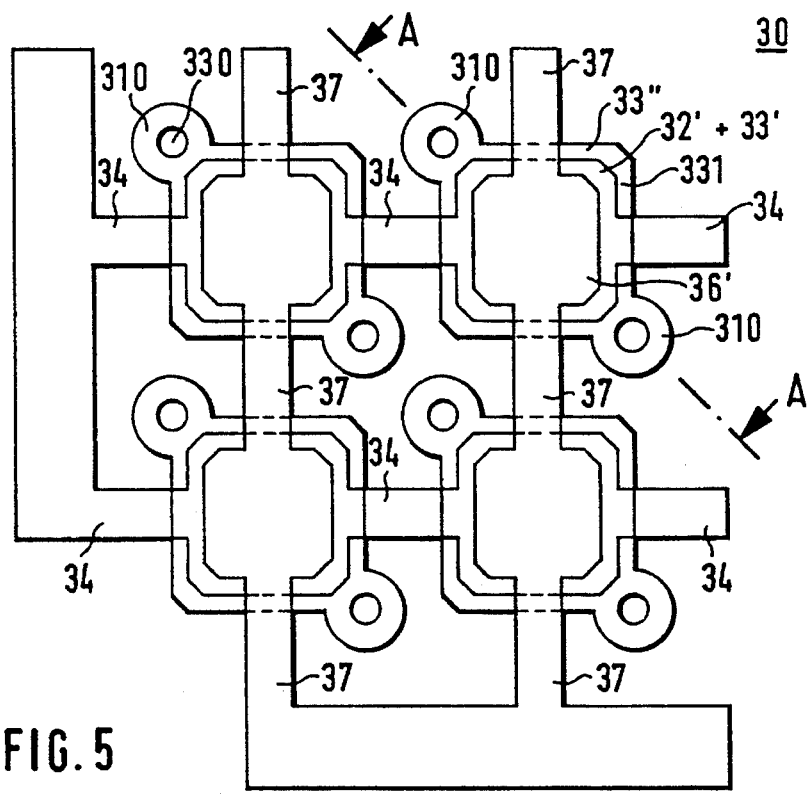
FIG. 5 is a top view of four capacitive absolute pressure sensors according to the first variant of the invention which are manufactured according to the third process variant.

FIG. 5, a more schematical top view than the views of FIGS. 1 and 3, shows an array of four virtually square absolute pressure sensors 30 according to the first variant of the invention which are made according to the third process variant, as will be explained below.

FIGS. 6a to 6h are sections taken along line A—A of FIG. 5 which illustrate the results of sequential process steps.

In the third process variant of the invention, instead of a sacrificial layer deposited in a single step, a sacrificial layer 33 deposited in two steps and thus consisting of a first partial layer 33' and a second partial layer 33" is used.

Therefore, a first metal layer 32, which contains a substrate electrode 32' to be formed, is deposited on a glass substate 31, cf. FIG. 6a. In FIGS. 6a to 6h, like in FIGS. 4a to 4h, only one surface of the glass substrate 31 can be seen as the lower edge of the respective sectional view.

After this process step, the entire surface is coated with a first patternable material layer which defines a first part of the height of the (yet-to-be-formed) cavity 38 and contains the first partial layer 33' of the sacrificial layer 33 to be formed.

The first material layer and the first metal layer 32 are then patterned in a single, first photoresist step by etching to simultaneously form the substrate electrode 32', first interconnection tracks 34 connected therewith, and the first partial layer 33', which is virtually congruent with the substrate electrode and the interconnection tracks. If the material used for the substrate electrode is chromium and the partial-layer material is aluminum, this is done sequentially like in the first process variant by applying the appropriate etchant, but through the same photoresist mask.

Thereafter, a second patternable material layer, which defines the remainder of the height of the cavity 38 and contains the second partial layer 33" of the sacrificial layer 33 to be formed and two diametrically opposed corner extensions 310, is deposited over the entire surface and is so patterned by a second photoresist step as to completely cover the first partial layer 33', and thus the underlying substrate electrode 32', cf. FIG. 6c. The second partial layer 33" thus has, around the first partial layer 33' and the substrate electrode 32', a covering region 331 where it firmly adheres to the glass substrate 31.

At this point it should be noted that the terms "covering" and "cover" as used herein mean that a layer deposited on a structure that has already been formed extends beyond the entire periphery of this structure onto the layer supporting this structure and firmly adheres to this layer.

The second partial layer 33" is preferably thinner than the first. The entire sacrificial layer 33 is therefore stepped in its height, as can be seen in FIG. 6c.

A first insulating layer 35, which contains the diaphragm 35', is now deposited over the entire surface, cf. FIGS. 5 and 6d, so that this layer firmly adheres to the areas of the glass substrate 31 still exposed after the preceding step. In the first insulating layer 35, openings 330 for the subsequent supply of an etchant to the sacrificial layer 33 are etched above the corner extensions 310 in the covering region 331 of the second partial layer 33", cf. FIGS. 5 and 6e.

If the insulating layer 35 is of $SiO_2$, the etching is again preferably carried out in a $CF_4$—$O_2$ plasma. During this etching process, the second partial layer 33" prevents the glass substrate 31 from being etched at the surface.

Next a photoresist mask is formed in a photoresist layer deposited over the entire surface. Its opening is congruent with a top electrode 36' to be formed and with second interconnection tracks 37 connected therewith, and is centered with the substrate electrode 32'. The entire photoresist mask is then coated with a second metal layer containing the top electrode 36' and the second interconnection tracks 37. The photoresist mask with the overlying portions of the second metal layer 36 is then removed by a lift-off step. This gives the structure shown in FIG. 6f; top electrode 36' and the second interconnection tracks 37 are left.

The sacrificial layer 33 is then removed by vertical etching and lateral etching through the openings 330, so that a cavity 38 forms under the diaphragm 35' in the place of the sacrificial layer 33. This is done in two stages, the first of which removes only a portion of the second partial layer 33" near the opening 330. An etch channel is thus formed for the subsequent etching of the remaining second partial layer 33" and the first partial layer 33', i.e., of the entire sacrificial layer 33. The result of this process step can be seen in FIG. 6g.

Finally the openings 330, and hence the cavity 38, are hermetically sealed by depositing a second insulating layer 39 in a vacuum, cf. FIG. 6h.

Figure 7:
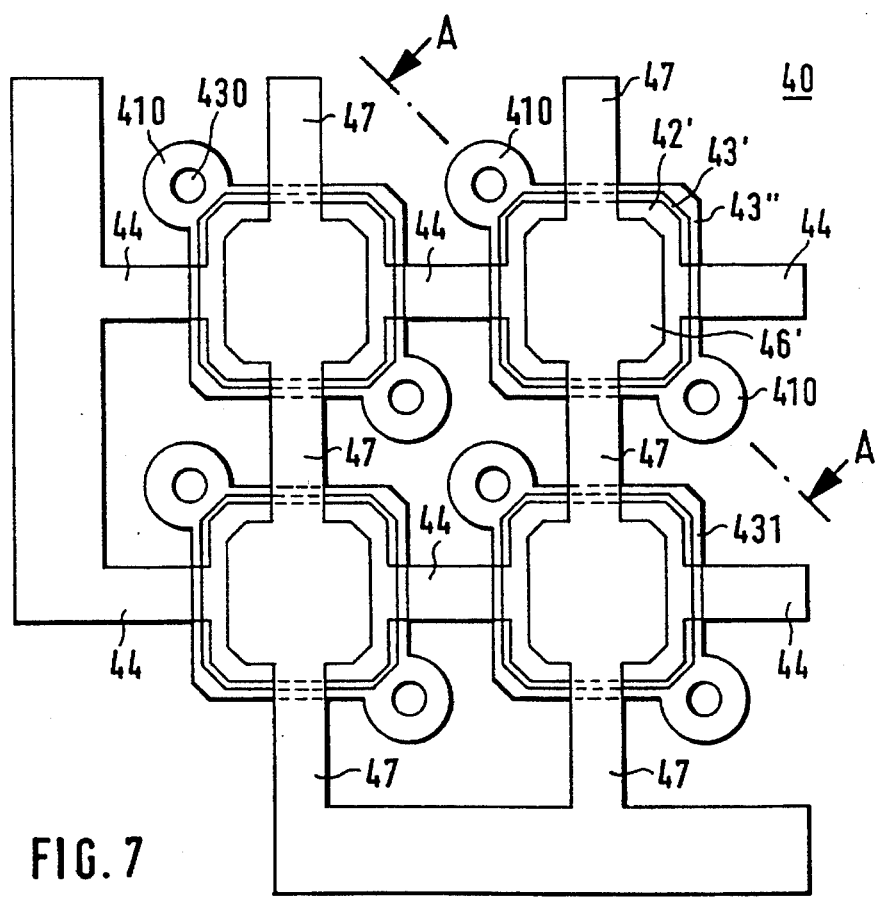
FIG. 7 is a top view of four capacitive absolute pressure sensors according to the first variant of the invention which are manufactured according to the fourth process variant.

FIG. 7, also a more schematic top view than FIGS. 1 and 3, shows an array of four virtually square absolute pressure sensors 40 according to the first variant of the invention which are manufactured according to the fourth process variant, as will be explained below. FIGS. 8a to 8h are sections taken along line A—A of FIG. 7, which illustrate the results of sequential pro-cess steps.

In the fourth process variant of the invention, too, instead of a sacrificial layer deposited in a single process step, a sacrificial layer 43' deposited in two steps and thus consisting of a first partial layer 43' and a second partial layer 43" is used.

Figure 8A:
FIG. 8 shows sections taken along line A—A of FIG. 7.

Therefore, a first metal layer 42 containing a substrate electrode 42' to be formed is deposited on a glass substrate 41 and subsequently patterned by a first photoresist step to form the substrate electrode 42' and first interconnection tracks 44 connected therewith, cf. FIG. 8a. Of the glass substrate 41, only one surface can be seen in FIGS. 8a to 8h as the lower edge of the respective section.

Figure 8B:
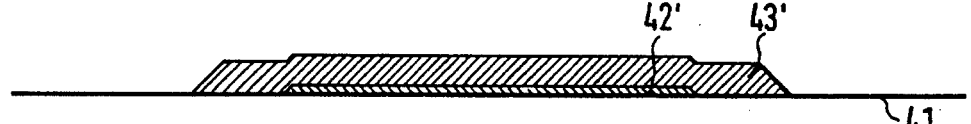

After this step, a first patternable material layer, which defines a first part of the height of the cavity 48 (to be formed) and contains the first partial layer 43' of the sacrificial layer 43 to be formed, is deposited over the entire surface and is so patterned by a second photoresist step as to completely cover the substrate electrode 42', cf FIGS. 7 and 8b.

Figure 8C:
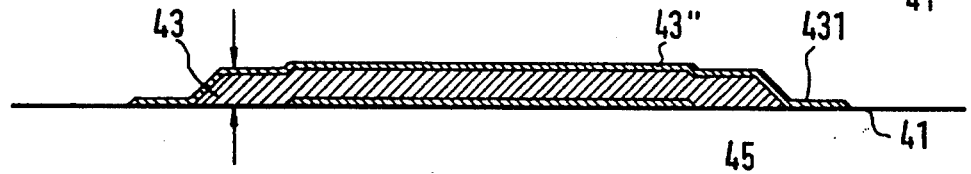

A second patternable material layer, which defines the remainder of the height of the cavity 48 (to be formed) and contains the second partial layer 43" of the sacrificial layer 43 to be formed, is then deposited over the entire surface and is so patterned by a third photoresist step as to completely cover the first partial layer 43' and to have two diametrically opposed corner extensions 410, cf. FIGS. 7 and 8c. The second partial layer 43" thus has, around the first partial layer 43', a covering region 431 where it firmly adheres to the glass substrate 41.

Preferably, the second partial layer 43" is thinner than the first. The entire sacrificial layer 43 is therefore stepped in its height.

Figure 8D:
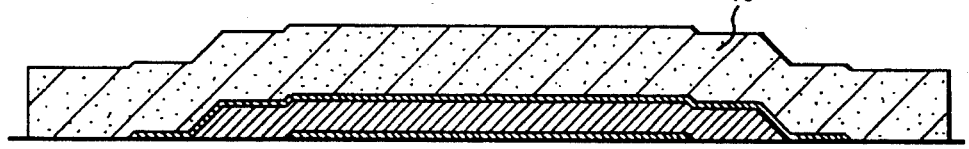
Figure 8E:
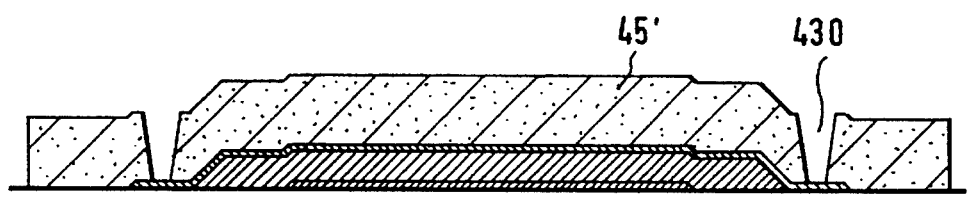
Figure 8F:
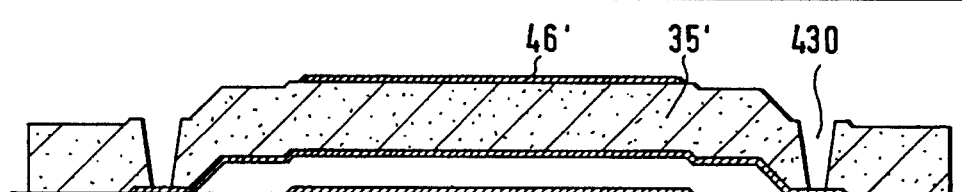
Figure 8G:
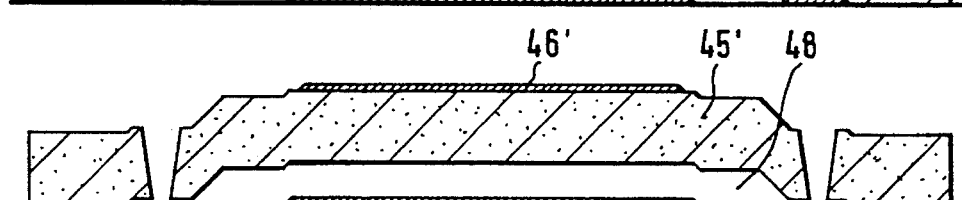

A first insulating layer 45 containing the diaphragm 45' is then deposited over the entire surface, cf. FIGS. 7 and 8d, so that it firmly adheres to the areas of the glass substrate 41 still exposed after the preceding step. Into the first insulating layer 45, openings 430 for the subsequent supply of an etchant to the sacrificial layer 43 are etched above the corner extensions 410 in the covering region 430 of the second partial layer 43", cf. FIGS. 7 and 8e.

If the insulating layer 45 is of $SiO_2$, the etching will preferably be carried out in a $CF_4$—$O_2$ plasma. During this etching, the second partial layer 43" prevents the glass substrate 41 from being etched at the surface.

In a photoresist layer subsequently deposited over the entire surface, a photoresist mask is formed whose opening is congruent with a top electrode 46' to be formed and with second interconnection tracks 47 connected therewith and is centered with the substrate electrode 42'.

The entire surface of the photoresist mask is then coated with a second metal layer containing the top electrode 46' and the second interconnection tracks 47. The photoresist mask with the overlying portions of the second metal layer is subsequently removed by a lift-off step. This gives the structure shown in FIG. 8f; the top electrode 46' and the second interconnection tracks 47 are left.

The sacrificial layer 43 is then removed by vertical etching and lateral etching through the openings 430, so that the cavity 48 forms under the diaphragm 45' in the place of the sacrificial layer 43. This is done in two stages, the first of which removes only a portion of the second partial layer 43" near the opening 430. This creates in an etch channel for the subsequent etching of the remaining second partial layer 43" and the first partial layer 43', i.e., of the entire sacrificial layer 43. The result of this process step can be seen in FIG. 8g.

Figure 8H:
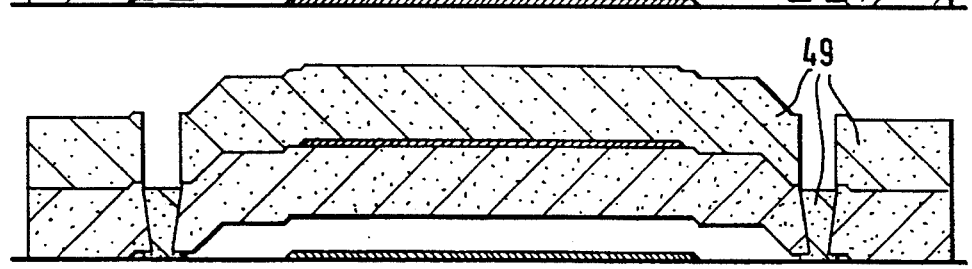

Finally the openings 430, and thus the cavity 48, are hermetically sealed by depositing a second insulating layer 49 in a vacuum, cf. FIG. 8h.

The division, in the third and fourth process variants, of the sacrificial layers 33 and 43 into the two partial layers 33', 33" and 43', 43", respectively, has the advantage that at the transition from the glass substrate 31, 41 to the sacrificial layer 33, 43, the insulating layer 35, 45 need not cover the height of the sacrificial layer in a single step as in the first and second process variants, but that this height is divided into two smaller steps. At these transitions, therefore, the thickness of the respective insulating layer 35, 45 is more uniform. Furthermore, the openings 330, 430 can be better hermetically sealed than the openings 230 in the second process variant, shown in FIGS. 3 and 4.

The first process variant requires two photoresist masks or photoresist steps, the second process variant three photoresist masks or photoresist steps, the third process variant four photoresist masks or photoresist steps, and the fourth process variant five photoresist masks or photoresist steps.

Figure 9:
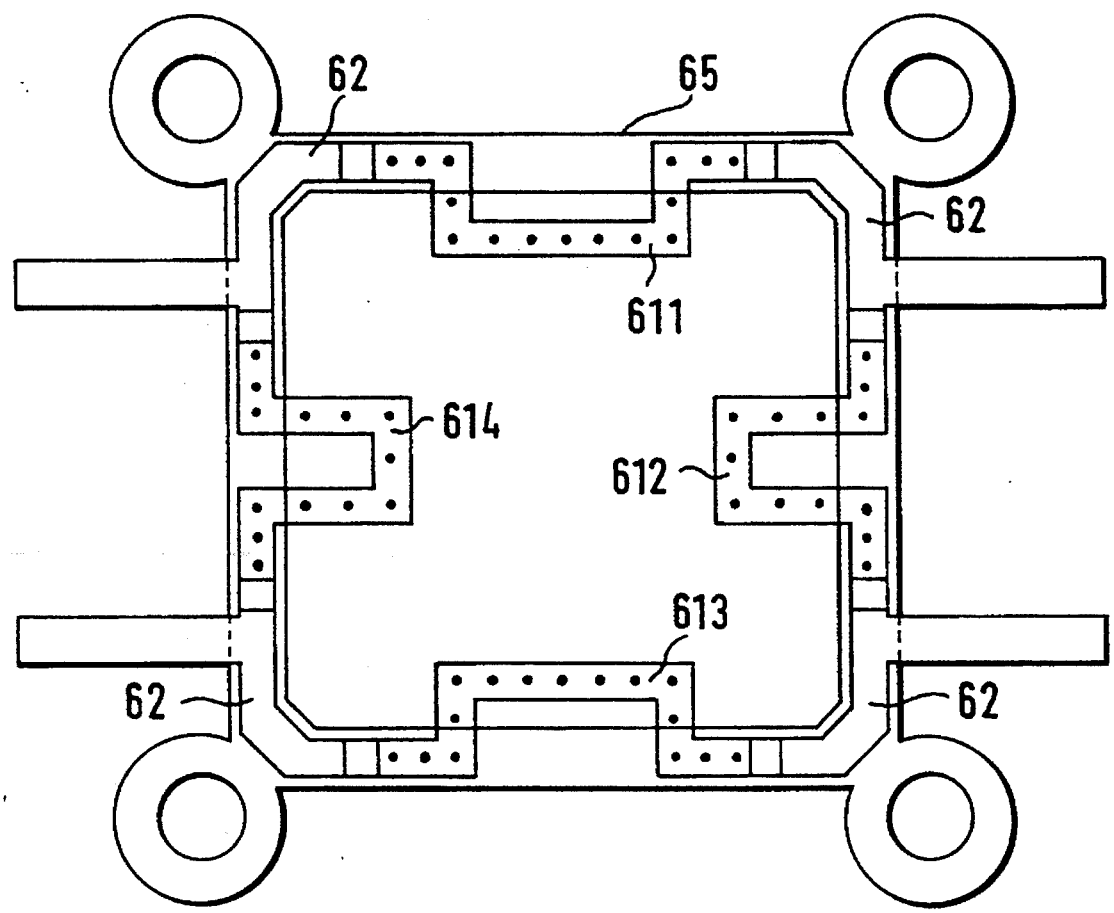
FIG. 9 is a top view of a resistive absolute pressure sensor according to the second variant of the invention.

FIG. 9 is a schematic top view of an embodiment of a resistive absolute pressure sensor 60 according to the second variant of the invention.

The resistive thin-film absolute pressure sensor 60 has a glass substrate and a diaphragm 65 which bound a hermetically sealed cavity. The diaphragm 65 is made of the material of a first insulating layer which firmly adheres to the substrate around the edge of the cavity. The diaphragm supports, on the side remote from the cavity, a piezoresistive half bridge or a piezoresistive full bridge and a second insulating layer which completely covers this bridge and the diaphragm 65 and hermetically seals the cavity below the diaphragm.

In FIG. 9, a full bridge 61 consisting of four piezoresistors 611, 612, 613, 614 is shown. The opposite piezoresistors are identical in construction, the piezoresistors 611, 613 lying in areas of the diaphragm 65 which will be compressed when pressure is applied, and the piezoresistors 612, 614 lying in areas of the diaphragm 65 which will expand when pressure is applied.

At the edge of the diaphragm 65, the four piezoresistors are interconnected by interconnection tracks 62 to form a full bridge, the interconnection tracks extending onto the substrate outside the diaphragm 65.

To manufacture resistive absolute pressure sensors according to the second variant of the invention, the above-explained process variants can be used, with the following modifications: Since no substrate electrode is necessary, the process steps for depositing and patterning the substrate electrode are omitted. Instead of the steps for depositing and patterning the top electrode, the piezoresistors of the half or full bridge and their connections are formed.

Throughout the above explanation of the invention, for linguistic and definitional convenience, the term "diaphragm" only means the patterned first insulating layer even though further layers, such as the top electrode and the second insulating layer, are deposited thereon. The capacitance- or resistance-pressure characteristic of the absolute pressure sensor is, of course, determined by the flexural properties of the whole diaphragm structure with all its layers.

We claim:

1. A thin-film process for manufacturing a capacitive absolute pressure sensor with a base element and a diaphragm which bound a hermetically sealed cavity, comprising the following steps in the order given:

a) depositing a first metal layer over the entire surface of a glass substrate serving as the base element, said first metal layer containing a substrate electrode to be formed;

b) depositing over the entire surface a patternable material layer which defines the height of the cavity and contains a sacrificial layer to be formed;

c) patterning the patternable material layer and the first metal layer in a single, first photoresist step by etching for simultaneously forming the substrate electrode, first interconnection tracks connected therewith, and the sacrificial layer, which is practically congruent with the substrate electrode and the first interconnection tracks, thereby partially exposing the glass substrate;

d) depositing a first insulating layer containing the diaphragm over the entire surface, so that said first insulating layer firmly adheres to the areas of the glass substrate exposed in step c), even in an edge region next to the sacrificial layer;

e) forming, in a photoresist layer deposited over the entire surface, a photoresist mask whose opening is congruent with a top electrode to be formed, which will extend onto the edge region of the first insulating layer next to the sacrificial layer, and with second interconnection tracks connected with the top electrode;

f) depositing a second metal layer containing the top electrode over the entire surface of the photoresist mask;

g) removing the photoresist mask with the overlying portions of the second metal layer by a lift-off step;

h) etching away the portions of the first insulating layer not covered by the top electrode and by the second interconnection tracks;

i) removing the sacrificial layer by lateral etching, starting from its portions lying on the first interconnection tracks, and k) hermetically sealing the cavity by depositing a second insulating layer over the entire surface in a vacuum.

2. A thin-film process for manufacturing a capacitive absolute pressure sensor with a base element and a diaphragm which bound a hermetically sealed cavity, comprising the following steps in the order given:

a) depositing a first metal layer over the entire surface of a glass substrate serving as the base element, said first metal layer containing a substrate electrode to be formed;

b) depositing over the entire surface a patternable material layer which defines the height of the cavity and contains a sacrificial layer to be formed;

c') patterning the patternable material layer and the first metal layer in a single, first photoresist step by etching for simultaneously forming the substrate electrode, corner pads connected therewith, and the sacrificial layer, which is practically congruent with the substrate electrode and the corner pads, thereby partially exposing the glass substrate;

d') depositing a first insulating layer containing the diaphragm over the entire surface, so that said insulating layer firmly adheres to the areas of the glass substrate exposed in step c'), even in four lateral regions next to the sacrificial layer, and etching openings into the first insulating layer for the subsequent supply of an etchant to the sacrificial layer, said openings lying over at least a part of the four corner pads of one absolute pressure sensor;

e') forming, in a photoresist layer deposited over the entire surface, a photoresist mask whose opening is congruent with a top electrode to be formed and with interconnection tracks connected therewith and is centered with the substrate electrode without the corner pads;

f) depositing a second metal layer containing the top electrode over the entire surface of the photoresist mask;

g) removing the photoresist mask with the overlying portions of the second metal layer by a lift-off step;

i') removing the sacrificial layer by vertical etching and lateral etching through the openings, and k') hermetically sealing the openings, and thus the cavity, by depositing a second insulating layer in a vacuum.

3. A thin-film process for manufacturing a capacitive absolute pressure sensor with a base element and a diaphragm which bound a hermetically sealed cavity, comprising the following steps in the order given:

a) depositing a first metal layer over the entire surface of a glass substrate serving as the base element, said first metal layer containing a substrate electrode to be formed;

b") depositing over the entire surface a first patternable material layer containing a first partial layer of a sacrificial layer to be formed, said first partial layer defining a first part of the height of the cavity;

c") patterning the patternable material layer and the first metal layer in a single, first photoresist step by etching for simultaneously forming the substrate electrode, first interconnection tracks connected therewith, and the first partial layer, which is practically congruent with the substrate electrode and the first interconnection tracks;

c''') depositing over the entire surface a second patternable material layer which defines the remainder of the height of the cavity and contains a second partial layer of the sacrificial layer to be formed and two diametrically opposed corner extensions, and patterning said second patternable material layer in a second photoresist step so that it completely covers the first partial layer;

d'') depositing a first insulating layer containing the diaphragm over the entire surface, so that said first insulating layer firmly adheres to the areas of the glass substrate still exposed after step c'''), and etching openings into the first insulating layer above the corner extensions for the subsequent supply of an etchant to the sacrificial layer;

e'') forming, in a photoresist layer deposited over the entire surface, a photoresist mask whose opening is congruent with a top electrode to be formed and with second interconnection tracks connected therewith and is centered with the substrate electrode;

f) depositing a second metal layer containing the top electrode over the entire surface of the photoresist mask;

g) removing the photoresist mask with the overlying portions of the second metal layer by a lift-off step;

i') removing the sacrificial layer by vertical etching and lateral etching through the openings, and k') hermetically sealing the openings, and thus the cavity, by depositing a second insulating layer in a vacuum.

4. A thin-film process for manufacturing a capacitive absolute pressure sensor with a base element and a diaphragm which bound a hermetically sealed cavity, comprising the following steps in the order given:

a') depositing a first metal layer over the entire surface of a glass substrate serving as the base element, said first metal layer containing a substrate electrode to be formed, and patterning said first metal layer in a first photoresist step for forming the substrate electrode and first interconnection tracks connected therewith;

b''') depositing over the entire surface a first patternable material layer which defines a first part of the height of the cavity and contains a first partial layer of a sacrificial layer to be formed, and patterning said first patternable material layer in a second photoresist step so that it completely covers the substrate electrode;

c'''') depositing over the entire surface a second patternable material layer which defines the remainder of the height of the cavity and contains a second partial layer of the sacrificial layer to be formed and two diametrically opposed corner extensions, and patterning said second patternable material layer in a third photoresist step so that it completely covers the first partial layer;

d'') depositing over the entire surface a first insulating layer containing the diaphragm, so that said first insulating layer firmly adheres to the areas of the glass substrate still exposed after step c''''), and etching openings into the first insulating layer above the corner extensions for the subsequent supply of an etchant to the sacrificial layer;

e'') forming, in a photoresist layer deposited over the entire surface, a photoresist mask whose opening is congruent with a top electrode to be formed and with second interconnection tracks connected therewith and is centered with the substrate electrode;

f) depositing a second metal layer containing the top electrode over the entire surface of the photoresist mask;

g) removing the photoresist mask with the overlying portions of the second metal layer by a lift-off step;

i') removing the sacrificial layer by vertical etching and lateral etching through the openings, and k') hermetically sealing the openings, and thus the cavity, by depositing a second insulating layer in a vacuum.

5. A thin-film process as claimed in claim 1 wherein the material used for the first metal layer, and thus for the substrate electrode, and/or the material used for the second metal layers, and thus for the top electrode, is chromium.

6. A thin-film process as claimed in claim 1 wherein the material used for the material layers is aluminum.

7. A thin-film process as claimed in claim 1 wherein the first and second insulating layers are of $SiO_2$ which is applied by plasma chemical vapor deposition.

8. A thin-film process as claimed in claim 1 wherein the top electrode serves as a mask for patterning the first insulating layer.

9. A thin-film process as claimed in claim 3 wherein the second partial layer of the sacrificial layer is thinner than the first partial layer of the sacrificial layer.

10. A thin-film process as claimed in claim 2 wherein the material used for the first metal layer, and thus for the substrate electrode, and/or the material used for the second metal layers, and thus for the top electrode, is chromium.

11. A thin-film process as claimed in claim 3 wherein the material used for the first metal layer, and thus for the substrate electrode, and/or the material used for the second metal layers, and thus for the top electrode, is chromium.

12. A thin-film process as claimed in claim 4 wherein the material used for the first metal layer, and thus for the substrate electrode, and/or the material used for the second metal layers, and thus for the top electrode, is chromium.

13. A thin-film process as claimed in claim 2 wherein the material used for the material layers is aluminum.

14. A thin-film process as claimed in claim 3 wherein the material used for the material layers is aluminum.

15. A thin-film process as claimed in claim 4 wherein the material used for the material layers is aluminum.

16. A thin-film process as claimed in claim 2 wherein the first and second insulating layers are of $SiO_2$ which is applied by plasma chemical vapor deposition.

17. A thin-film process as claimed in claim 3 wherein the first and second insulating layers are of $SiO_2$ which is applied by plasma chemical vapor deposition.

18. A thin-film process as claimed in claim 4 wherein the first and second insulating layers are of $SiO_2$ which is applied by plasma chemical vapor deposition.

19. A thin-film process as claimed in claim 4 wherein the second partial layer of the sacrificial layer is thinner than the first partial layer of the sacrificial layer.

* * * * *